Feb. 28, 1967 G. W. COPE 3,306,400
SELF-ALIGNING BRAKE HEAD ASSEMBLY
Filed Dec. 24, 1964

Inventor:
Geoffrey W. Cope
By *Wilmer Mechlin*
his Attorney

United States Patent Office 3,306,400
Patented Feb. 28, 1967

3,306,400
SELF-ALIGNING BRAKE HEAD ASSEMBLY
Geoffrey W. Cope, Williamsville, N.Y., assignor to Symington Wayne Corporation, Salisbury, Md., a corporation of Maryland
Filed Dec. 24, 1964, Ser. No. 420,920
6 Claims. (Cl. 188—220.1)

This invention relates generally to brake gear for railway trucks, and more particularly to the brake beams and heads of such gear.

In the usual railway truck, the springs for supporting the imposed weight of the car body and any lading are interposed between the bolster and each side frame and the relative positions of the side frames and axes of the wheels are substantially fixed and unchanged by the loading of the car. It, therefore, is possible not only to support the brake beams on the side frames either in guide slots or on hangers, but to depend on that support to produce substantially the same contact between the rims of the wheels and the brake shoes carried by the heads under all operating conditions. Consequently, it is the present practice in the brake gear of the usual truck to mount the brake heads stationarily on the brake beams and even to make a brake beam and its heads integral. However, a different situation obtains in a truck of the type described in Couch Patent No. 2,720,848, issued October 18, 1955, in which the supporting springs are interposed between each side frame and separate journal boxes mounted in jaws at its ends. In such a truck there is vertical movement between the side frames and the axes of the wheels when a car is in motion and the height of the side frames relative to the axes also changes with change in the loading of the car. Thus, if the brake beams are supported by the side frames and the heads cannot move relative to the beams, full bearing between the brake shoes and the wheels cannot be obtained over the range of service conditions.

The primary object of the present invention is to provide for a railway truck in which the side frames move vertically in service relative to the wheel axes, an improved brake head and beam assembly whereby a brake head will align itself with the axis of the associated wheel on a brake application even though the brake beam mounting the head is supported on the side frames.

Another object of the invention is to provide a railway brake head and beam assembly wherein the head not only is readily removable from the beam but is so rotatably mounted thereon as to be self-aligning on a brake application and self-centering on release of the brakes.

A further object of the invention is to provide a brake head and beam assembly wherein the same means releasably locks the head against lateral displacement and yieldably resists its rotative movement from a normal position relative to the beam.

An additional object of the invention is to provide a brake head and beam assembly for a brake beam mountable in guide slots in the side frames wherein the head is rotatably mounted on and locked against lateral displacement relative to the beam and a guide lug on the end of the beam serves to hold the head thereon in case of breakage of the assembly's locking means.

Other objects and advantages of the invention will appear hereinafter in the detailed description, be particularly pointed out in the appended claims, and be illustrated in the accompanying drawings, in which:

Figure 1:
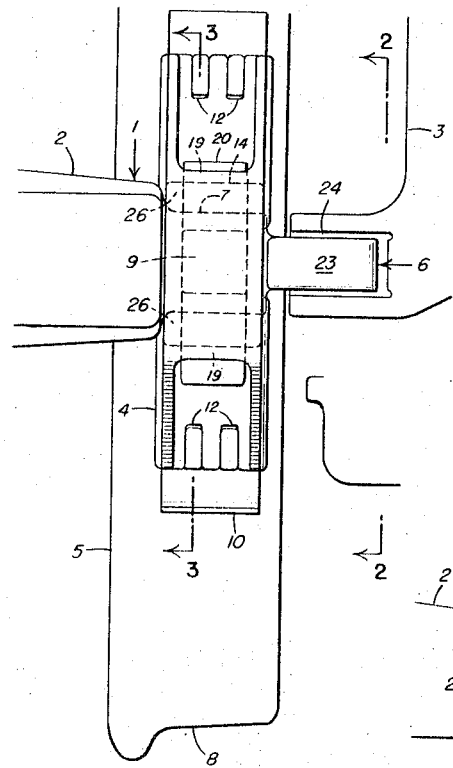
FIGURE 1 is a fragmentary plan view of a railway truck incorporating a preferred embodiment of the improved brake head and beam assembly of the present invention.
Figure 2:
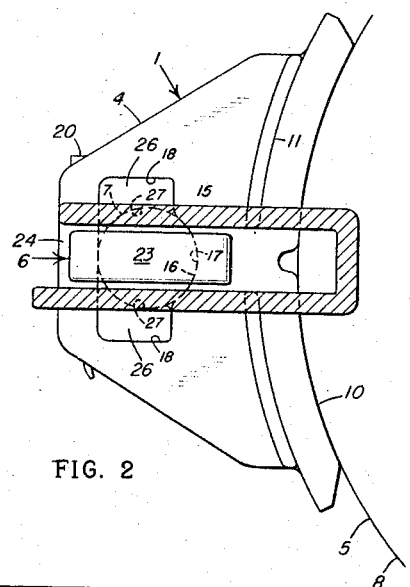
FIGURE 2 is a vertical sectional view taken along lines 2—2 of FIGURE 1.
Figure 5:
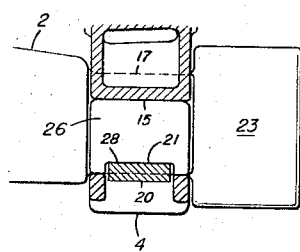
FIGURE 5 is a horizontal sectional view of the assembly of FIGURE 4, taken along line 5—5 of FIGURE 3.
Figure 4:
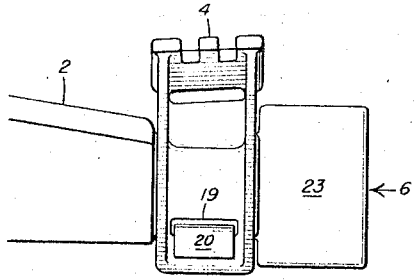
FIGURE 4 is a plan view of the improved assembly with the brake shoe and its key removed from the brake head.
Figure 3:
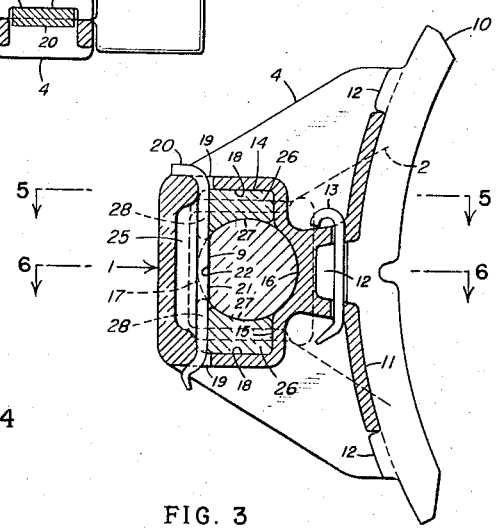
FIGURE 3 is a fragmentary vertical sectional view taken along lines 3—3 of FIGURE 1.
Figure 6:
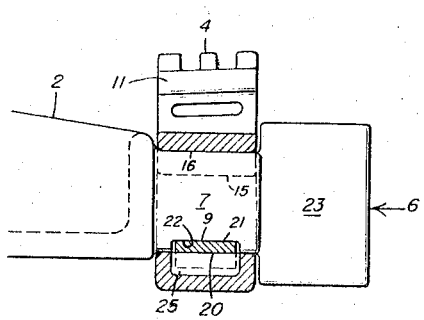
FIGURE 6 is a horizontal sectional view of the assembly of FIGURE 4, taken along lines 6—6 of FIGURE 3.

Referring now in detail to the drawings in which like reference characters designate like parts, the improved brake head and beam assembly or, as sometimes hereafter called for brevity, "brake assembly," designated as 1, is adaptable for use in the brake gear of any railway truck, but is particularly useful in a truck, such as that of the earlier mentioned Couch patent, in which each side frame is spring-supported on separate journal boxes.

The improved assembly is comprised of a brake beam 2 of suitable type and suitably mounted on each side frame, indicated at 3, of a railway truck (not otherwise shown), and a brake head 4 mounted on the beam for rotation about an axis extending longitudinally of the beam and substantially parallel to the axis of the associated or adjoining wheel 5. Since one end portion 6 of the beam 2 is the counterpart of the other and the brake heads 4 mounted on the opposite end portions are identical and interchangeable, the showing in the drawings of one end portion and the brake head mounted thereon will suffice for an understanding of the invention.

For mounting the brake head 4 on the end portion 6 of the brake beam 2, the end portion has a cylindrical hub, seat, bearing or sleeve 7 laterally aligned with or centered on the rim 8 of the adjoining wheel 5 and struck about an axis extending longitudinally of the beam and transversely of the side frame 3. Substantially paralleling the axis of the adjoining wheel 5, the cylindrical hub 7 has in its side away from the wheel 5, a preferably vertically extending, segmental key slot 9.

Aside from its construction for mounting on the brake beam 2, the brake head 4 may be of any suitable design and adapted to mount at the front a brake shoe 10 of any suitable type. Thus, typically, the illustrated brake head 4 has a front face 11 conforming to the curvature of the wheel 5 and is slotted laterally at and midway of the vertical extremities of that face to receive correspondingly positioned ribs 12 on the back of the shoe. The illustrated shoe is locked to the head by a shoe key 13 inserted in the head and extending vertically through the intervening middle rib of the shoe.

To receive the end portion 6 of the brake beam 2, the brake head 4, rearwardly of its front face 11, has centered vertically on it and extending laterally through it, an aperture or opening 14. At maximum, here at its vertical center, the lateral aperture 14 is wider than the cylindrical seat or hub 7 on the brake beam 2 and the front wall 15 of the aperture is interrupted centrally by a rearwardly facing or opening, laterally extending or disposed, cylindrically concave seat, cavity or socket 16 of the radius of or coradial with the hub 7 for partly receiving and seating the latter.

Adjacent the aperture's vertically extending rear wall 17, its top and bottom or side walls 18 are pierced by vertically aligned key slots 19 through which is inserted a flat-bodied head, connecting or locking key 20 of spring steel or like material. Of substantially the width of the key slot 9 in the hub 7, the resilient or spring key 20 is designed to fit in that slot with its flat front face 21 normally tight against the flat inner wall 22 of the slot and, when so fitted and with the opposite side of the hub 7 seated in the seat 16, to be somewhat bowed or flexed rearwardly so as to hold the hub in the seat. Since it, itself, is held against lateral displacement by the ends of the slots 19 in the walls 18 and lateral displacement between itself and the hub 7 is prevented or limited by the sides of the key slot 9 in the hub, the key 20 both is locked against accidental displacement and locks the head 4 against lateral displacement longitudinally of the beam 2. Too, the spring key 20, by pressing the hub 7 forwardly against the seat 16, yieldably resists rotation of the head 4 on the hub and, so long as it remains partly in the slot 9, on release of an applied braking force, will, by a camming action, urge the head to return to normal or neutral position in which the face 21 of the key is fully seated against the inner wall 22 of the hub slot.

In the illustrated embodiment, the brake beam 2 is of the so-called "Unit" type and has at each end, outwardly of the adjoining hub 7, a flat guide lug 23, oblong in cross-section and of greater width than the hub. For both supporting the brake beam 2 and guiding it in a brake application, the guide lug 23 is received and adapted to slide width-wise in a substantially or generally horizontally disposed or directed and elongated guide slot 24 in and integral with the inner side of the side frame 3.

For enabling the brake head 4 to pass the guide lug 23, when applied to or removed from the brake beam 2, the aperture 14 in the hub is generally oblong and dimensioned in cross-section to pass the guide lug. However, where the transverse elongation of the guide lug 23 is substantially or generally horizontal when it is received in the guide slot 24, that of the aperture 14 is vertical, so that, to pass the guide lug, the head must be turned through substantially 90° from the position shown in the drawings. Since the normal spacing of the brake shoe 10 from the adjoining wheel 5 with the brakes released will not permit such turning, the guide lug 23 effectively backstops the connecting key 20 and prevents the brake head 4 from falling off the brake beam 2 in case of breakage or loss of the key.

The preferred oblong cross-section of the aperture 14 in the brake head 4, except for the hub seat 16 in the front wall 15 and a recess 25 in the rear wall 17 to accommodate rearward bowing or flexing of the key 20, by limiting contact between the head and the hub 7 to the seat, would unduly burden the key with the weight of the hub. To relieve this burden, the space in the aperture 14 about the hub 7, except for the recess 25, is substantially filled by upper and lower bearing blocks 26 which present cylindrically concave coradial faces 27 to the hub 7 and, otherwise, conform in configuration to and engage the front, side and rear walls 15, 18 and 17, respectively, of the aperture, the rear wall beyond the lateral extremities or ends of the recess 25. Slidable or insertable endwise into the aperture 14 before insertion of the key 20, the bearing blocks 25 are interrupted at the rear by vertically extending grooves or slots 27 for receiving the key and of the width of the hub slot 9. Thus locked in place by the key 20, the bearing blocks 26 spread the transverse forces between the head 4 and the hub 7 over the several walls of the aperture 14.

In use, it ordinarily will be preferred that the brake head 4 be centered vertically on the axis of the adjoining wheel 5, when the car in which it is installed is unloaded. With this arrangement, the centered condition shown in the drawings will obtain when the car is unloaded and the axis of the hub 7 and thus the rotative axis of the head, will move or drop below that of the wheel as the car is loaded. Consequently, in a brake application, with the car loaded and the side frames 3 at rest height, the upper end of the brake shoe 10 will first engage the rim 8 of the wheel 5 and the continued application of the braking force will cause the head to turn on the hub against the resistance of the spring key 20 to the position in which the shoe is in full bearing engagement with the rim. The depth of the key slot 9 in the hub 7 being so calculated that the key 20 will be partly contained in the slot over the full range of vertical movement of the side frames 3 relative to the axes of the wheels 5, the head 4 and beam 2 will remain locked by the key during the brake application and, on release of the brakes, the key will urge the head to turn back to its initial or normal position. However, if for any reason the force applied by the key 20 is insufficient to return the head 4 to normal position, the head, nonetheless, will align itself with the wheel 5 and provide full bearing for the brake shoe 10 on the next application of the brakes.

From the above detailed description it will be apparent that there has been provided an improved brake assembly which, as applied to a truck in which the side frames move vertically relative to the axes of the wheels, enables the brake beams to be mounted on the side frames without detriment to full bearing between the brake shoes and the wheels on a brake application. It should be understood that the described and disclosed embodiment is merely exemplary of the invention and that all modifications are intended to be included that do not depart from the spirit of the invention and the scope of the appended claims.

Having described my invention, I claim:

1. A railway brake assembly comprising a brake beam having a cylindrical hub on an end portion thereof, said hub having a segmental slot therein, a brake head rotatably mounted on said hub, and resilient means in said head and received in said slot for locking said head against lateral displacement, said resilient means having a flat face normally engaging a flat inner wall of said slot for yieldably resisting rotation of said head out of a normal position.

2. A railway brake assembly comprising a brake beam having a cylindrical hub on an end portion thereof, said hub having a segmental slot therein, a brake head rotatably mounted on said hub, and resilient means in said head and received in said slot for locking said head against lateral displacement, said resilient means having a flat face engaging a flat inner wall of said slot for yieldably resisting rotation of said head out of a normal position in a brake application and thereafter urging said head to return to said position.

3. A railway brake assembly comprising a brake beam having a cylindrical hub on an end portion thereof, said hub having a segmental slot therein, a brake head rotatably mounted on said hub, and resilient key means inserted in said head and received in said slot for locking said head against lateral displacement relative to said hub, said key means having a flat face normally engaging a flat inner wall of said slot for yieldably resisting rotation of said head out of a normal position in a brake application and thereafter urging said head to return to said position.

4. A railway brake assembly comprising a brake beam having a cylindrical hub on an end portion thereof, said hub having a segmental slot therein, a guide lug of horizontally elongated oblong cross-section at an end of said beam outwardly of said hub, a brake head having an aperture of vertically elongated oblong cross-section extending therethrough for passing said lug and receiving said hub, a cylindrically concave seat in a front wall of said aperture for seating said hub and rotatably mounting said head thereon, and a resilient key extending through side walls of said aperture and received in said slot for locking said head against lateral displacement relative to said beam, said key having a flat front face normally engaging a flat inner wall of said slot for yieldably resisting rotation of said head out of a normal position in a brake application and thereafter urging said head to return to said position.

5. A railway brake assembly comprising a brake beam having a cylindrical hub on an end portion thereof, said hub having a segmental slot therein, a guide lug of horizontally elongated oblong cross-section at an end of said beam outwardly of said hub, a brake head having an aperture of vertically elongated oblong cross-section extending therethrough for passing said lug and receiving said hub, a cylindrically concave seat in a front wall of said aperture for seating said hub and rotatably mounting said head thereon, bearing blocks inserted in and substantially filling said aperture about and having cylindrically concave faces engaging said hub, grooves in said blocks normally aligned with said slot, and a resilient key inserted in said head and extending across said aperture, said key being received in said slot and apertures for locking said head and blocks against lateral displacement relative to said beam, and said key having a flat face normally engaging an inner wall of said slot for yieldably resisting rotation of said head out of a normal position on said hub.

6. A railway brake assembly comprising a brake beam having a cylindrical hub on an end portion thereof, a segmental slot extending vertically through a rear part of said hub, a guide lug of horizontally elongated oblong cross-section on said beam outwardly of said hub, a brake head having an aperture of vertically elongated oblong cross-section extending laterally therethrough for passing said lug and receiving said hub, a cylindrically concave seat in a front wall of said aperture for seating said hub and rotatably mounting said head thereon, a pair of bearing blocks inserted laterally into and substantially filling said aperture above and below said hub and having grooves in the rears thereof normally aligning with said slot, and a resilient key extending vertically through side walls of said aperture and received in said slot and apertures for locking said head and blocks against lateral displacement relative to said beam, said key having a flat front face normally engaging a flat inner wall of said slot for yieldably resisting rotation of said head out of a normal position in a brake application and thereafter urging said head to return to said position.

References Cited by the Examiner

UNITED STATES PATENTS

| | | | |
|---|---|---|---|
| 1,434,819 | 11/1922 | Hedgcock | 188—221.1 |
| 2,490,204 | 12/1949 | Busch | 188—219.6 |

DUANE A. REGER, *Primary Examiner.*